(12) United States Patent
Tsai et al.

(10) Patent No.: US 9,354,749 B2
(45) Date of Patent: May 31, 2016

(54) OPTICAL TOUCH SYSTEM WITH BRIGHTNESS COMPENSATION AND BRIGHTNESS COMPENSATION METHOD THEREOF

(71) Applicant: PixArt Imaging Inc., Hsin-Chu County (TW)

(72) Inventors: Cheng-Nan Tsai, Hsin-Chu (TW); Tzung-Min Su, Hsin-Chu (TW); Chih-Hsin Lin, Hsin-Chu (TW); Yaun-Yu Peng, Hsin-Chu (TW); Yu-Chia Lin, Hsin-Chu (TW); Chuan-Ching Lin, Hsin-Chu (TW); Teng Wei Hsu, Hsin-Chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 106 days.

(21) Appl. No.: 14/052,481

(22) Filed: Oct. 11, 2013

(65) Prior Publication Data

US 2014/0111481 A1 Apr. 24, 2014

(30) Foreign Application Priority Data

Oct. 24, 2012 (TW) .............................. 101139191 A (51) Int. Cl.
*G06F 3/042* (2006.01)

(52) U.S. Cl.
CPC ...................................... *G06F 3/042* (2013.01)

(58) Field of Classification Search
CPC ........................................................ G06F 3/042
See application file for complete search history.

(56) References Cited

U.S. PATENT DOCUMENTS

2010/0321309 A1* 12/2010 Lee et al. .............. G06F 3/0421
345/173
2011/0102377 A1* 5/2011 Liao et al. ............. G06F 3/0428
345/175

FOREIGN PATENT DOCUMENTS

TW 201117065 A1 5/2011
TW 201120710 A1 6/2011

* cited by examiner

*Primary Examiner* — Kumar Patel
*Assistant Examiner* — Insa Sadio
(74) *Attorney, Agent, or Firm* — Hauptman Ham, LLP (57) ABSTRACT

There is provided an optical touch system including a touch surface, a plurality of image sensors and a plurality or compensation light sources, wherein each of the image sensors is adjacent to one of the compensation light sources. When one of the image sensors is capturing an image frame, the compensation light source not adjacent to and within a field of view of the image sensor which is capturing the image frame irradiates so as to compensate a brightness distribution of the image frame.

13 Claims, 10 Drawing Sheets

OPTICAL TOUCH SYSTEM WITH BRIGHTNESS COMPENSATION AND BRIGHTNESS COMPENSATION METHOD THEREOF

CROSS REFERENCE TO RELATED APPLICATION

This application claims the priority benefit of Taiwan Patent Application Serial Number 101139191, filed on Oct. 24, 2012, the full disclosure of which is incorporated herein by reference.

BACKGROUND

1. Field of the Disclosure

This disclosure generally relates to an optical touch system and, more particularly, to an optical touch system with brightness compensation and a brightness compensation method thereof.

2. Description of the Related Art

An optical touch system generally utilizes an image sensor to capture a plurality of image frames containing a touch surface image and performs the object tracking according to the position variation of a finger image in the image frames.

Figure 1A:
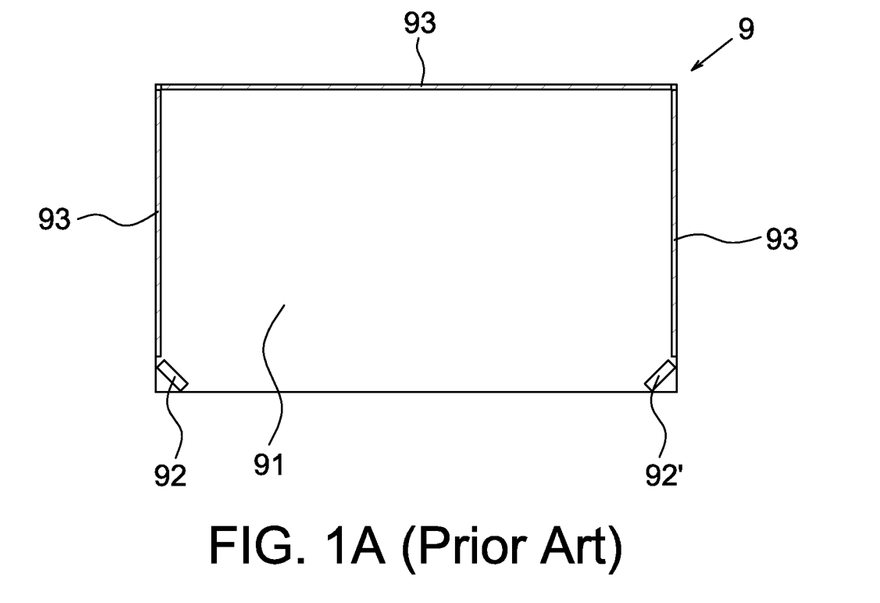
FIG. 1A shows a schematic diagram of a conventional optical touch system.

For example referring to FIG. 1A, it shows a schematic diagram of the conventional optical touch system 9, which includes a touch surface 91, two image sensors 92, 92' and a plurality of light bars 93. When the image sensors 92 and 92' are capturing images, the light bars 93 emit light to allow the image sensors 92 and 92' to receive the light from the light bars 93. In this manner, when a finger (not shown) is in contact with the touch surface 91, the image sensors 92 and 92' can capture image frames containing a dark region formed by the finger blocking the light bars 93, and a processing unit (not shown) can identify the finger position according to the image frames.

Figure 1B:
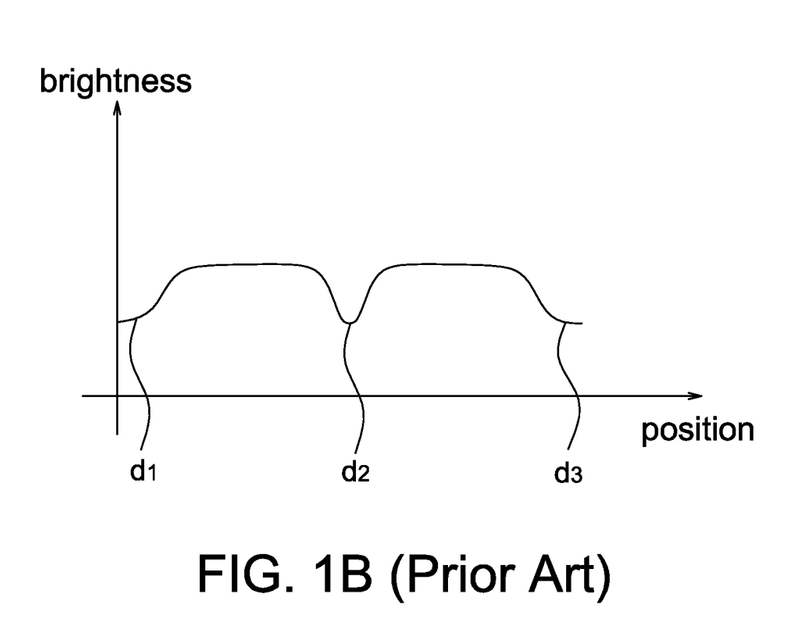
FIG. 1B shows a schematic diagram of the brightness distribution of the image frame captured by the image sensor of the optical touch system of FIG. 1A.

However, brightness at corners of the touch surface 91 is not continuous due to the disposition angle of the light bars 93 such that the brightness distribution of the image frames captured by the image sensors 92 and 92' is not uniform even though there is no finger touches the touch surface 91, e.g. the three dark regions $d_1$-$d_3$ shown in FIG. 1B. Therefore, misidentification of the finger position may occur when the processing unit performs the image processing.

Accordingly, the present disclosure further provides an optical touch system with brightness compensation and a brightness compensation method thereof that may be adjusted before shipment to allow the image sensor to capture image frames having a substantially uniform brightness distribution.

SUMMARY

The present disclosure provides an optical touch system with brightness compensation and a brightness compensation method thereof that utilize the compensation light source to compensate the dark region in the image frame such that the image sensor may capture image frames having a substantially uniform brightness distribution.

The present disclosure further provides an optical touch system with brightness compensation and a brightness compensation method thereof that may compensate dark regions using the system light source or the additional compensation light source.

The present disclosure provides an optical touch system including a touch surface, a plurality of reflection light bars, a first image sensor, a first active light source and a second active light source. The reflection light bars are respectively disposed at a plurality of edges of the touch surface. The first image sensor is configured to capture image frames looking across the touch surface. The first active light source is disposed adjacent to the first image sensor. The second active light source is disposed at a corner of the touch surface and within a field of view of the first image sensor; wherein during an interval that the first image sensor captures a first image frame, the first active light source emits light with a first brightness value and the second active light source emits light with a second brightness value, which is smaller than the first brightness value, to compensate a brightness distribution of the first image frame.

The present disclosure further provides an optical touch system including a touch surface, a plurality of irradiation light bars, a first image sensor and an active light source. The irradiation light bars are respectively disposed at a plurality of edges of the touch surface. The first image sensor is configured to capture image frames looking across the touch surface. The active light source is disposed at a corner of the touch surface and within a field of view of the first image frame; wherein during an interval that the first image sensor captures a first image frame, at least a part of the irradiation light bars and the active light source emit light to compensate a brightness distribution of the first image frame.

In one aspect, the corner of the touch surface disposing the active light source may be further disposed with a second image sensor configured to capture image frames looking across the touch surface.

In one aspect, a first active light source may further be disposed adjacent to the first image sensor. The first image sensor and the first active light source are disposed at one of the edges of the touch surface or at a corner of the touch surface not disposing the active light source.

In one aspect, the active light source and the first active light source may be dot light sources to be served as compensation light sources.

The present disclosure further provides a compensation method of an optical touch system. The optical touch system includes a touch surface, a plurality of light bars, a plurality of image sensors and a plurality of active light sources, and each of the image sensors is adjacent to one of the active light sources. The compensation method includes a first working mode and a second working mode executed sequentially. In the first working mode, a first image sensor captures a first image frame and the active light source(s) not adjacent to the first image sensor and within a field of view of the first image sensor emits light to compensate a brightness distribution of the first image frame. In the second working mode, a second image sensor captures a second image frame and the active light source(s) not adjacent to the second image sensor and within a field of view of the second image sensor emits light to compensate a brightness distribution of the second image frame.

In one aspect, the light bars are reflection light bars. In the first working mode the active light source adjacent to the first image sensor and the active light source not adjacent to the first image sensor but within the field of view of the first image sensor emit light with different brightness values. In the second working mode the active light source adjacent to the second image sensor and the active light source not adjacent to the second image sensor but within the field of view of the second image sensor emit light with different brightness values.

In one aspect, the light bars are irradiation light bars. In the first working mode the active light source adjacent to the first image sensor does not emit light whereas the active light source not adjacent to the first image sensor but within the field of view of the first image sensor emits light. In the second working mode the active light source adjacent to the second image sensor does not emit light whereas the active light source not adjacent to the second image sensor but within the field of view of the second image sensor emits light.

In one aspect, the image sensors and the active light sources adjacent to the image sensors may be disposed at edges or corners of the touch surface.

In one aspect, when a light source number of the active light sources is larger than a sensor number of the image sensors, the active light source not adjacent to the image sensors is disposed at a corner of the touch surface.

In the optical touch system with brightness compensation and the brightness compensation method according to the embodiment of the present disclosure, additional compensation light sources are disposed at the corner of the touch surface or adjacent to the image sensor so as to compensate the non-uniform brightness distribution and the brightness parameter of the compensation light sources may be previously set before shipment.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Referring to FIGS. 2A-2D, they show schematic diagrams of the optical touch system with brightness compensation according to an embodiment of the present disclosure. The optical touch system according to the embodiment of the present disclosure includes a touch surface 11, a plurality of light bars 121-124, a plurality of image sensors and a plurality of dot light sources, wherein the light bars 121-124 are respectively disposed at a plurality of edges of the touch surface 11. For example, the touch surface 11 is shown as a rectangle and having four corners 111-114 herein, and the light bars 121-124 are respectively disposed at four edges 121-124 of the rectangle. It should be mentioned that the touch surface 11 is not limited to be the rectangle and it may be other polygons. The number of the light bars 121-12 is not limited to four as long as the field of view of each image sensor covers the light bar(s). In this embodiment, according to different applications the light bars 121-124 may be reflection light bars (i.e. the passive light source) or irradiation light bars (i.e. the active light source), and the image sensors are configured to capture image frames looking across the touch surface 11. When an object (e.g. a finger or a touch pen) is close to or in contact with the touch surface 11, the image sensors may capture image frames containing the object blocking the light bars 121-124, wherein said image frame looking across the touch surface may or may not contain the image of the touch surface 11.

When the light bars 121-124 are reflection light bars, the dot light sources are served as both the system light sources and the compensation light sources. When the light bars 121-124 are irradiation light bars, the dot light sources are served as the compensation light sources.

The image sensors may be CCD image sensors, CMOS image sensors or the like, and may capture images at a fixed or variable sampling frequency.

In the present disclosure, in order to allow the image frame captured by the image sensors and containing no object image to have a uniform brightness distribution, each of the image sensors is disposed adjacent to one of the dot light sources and each of the corners (e.g. 111-114), even no image sensor disposed, of the touch surface 11 are disposed with one of the dot light sources so as to compensate the brightness distribution of the image frames, wherein the description "the image sensor adjacent to the dot light source" is referred to that the dot light source is disposed around the image sensor and does not block the field of view of the image sensor. For example as shown in FIGS. 2A-2D, the dot light sources are disposed on the upper rim of the image sensors, but the present disclosure is not limited to. In the present disclosure, the dot light sources may be light modules formed by one light emitting diode or by arranging a plurality of light emitting diodes together, and the dot light sources preferably emit invisible light, but not limited thereto.

Figure 2A:
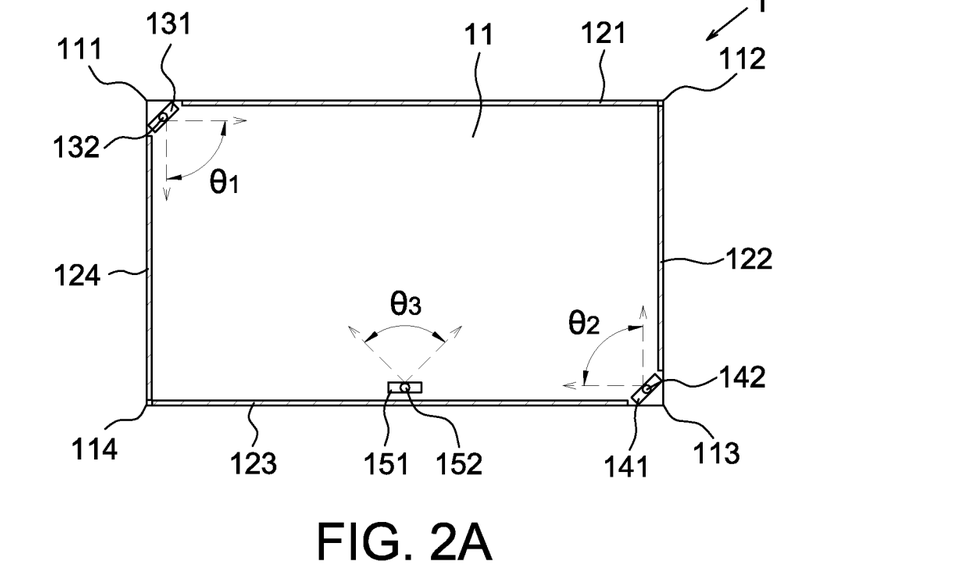
FIGS. 2A-2D show schematic diagrams of the optical touch system according to an embodiment of the present disclosure.

For example in FIG. 2A, the optical touch system 1 includes the touch surface 11, the light bars 121-124, a first image sensor 131, a first dot light source 132, a second image sensor 141, a second dot light source 142, a third image sensor 151 and a third dot light source 152, wherein the image sensors 131, 141 and 151 are all configured to capture image frames looking across the touch surface 11. The first dot light source 132 is disposed adjacent to the first image sensor 131; the second dot light source 142 is disposed adjacent to the second image sensor 141; and the third dot light source 152 is disposed adjacent to the third image sensor 151. In this embodiment, the first image sensor 131 and the first dot light source 132 are disposed at a corner 111 of the touch surface 11; the second image sensor 141 and the second dot light source 142 are disposed at a corner 113 of the touch surface 11; and the third image sensor 151 and the third dot light source 152 are disposed at an edge 123 of the touch surface 11. For illustration purpose, the second image sensor 141 and the second dot light source 142 as well as the third image sensor 151 and the third dot light source 152 are within a field of view $\theta_1$ of the first image sensor 131; the first image sensor 131 and the first dot light source 132 are within a field of view $\theta_2$ of the second image sensor 141 and a field of view $\theta_3$ of the third image sensor 151.

Figure 2B:
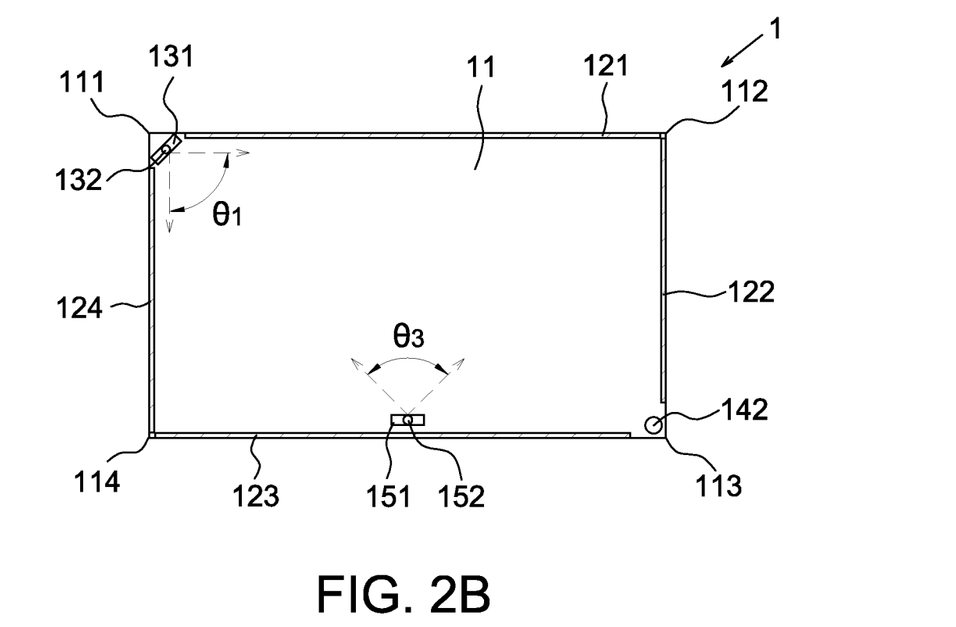

In FIG. 2B, the optical touch system 1 includes the touch surface 11, the light bars 121-124, the first image sensor 131, the first dot light source 132, the second dot light source 142, the third image sensor 151 and the third dot light source 152. The difference from FIG. 2A is that in this embodiment the corner 113 of the touch surface 11 is only disposed with the second dot light source 142 without disposing any image sensor, and other elements are similar to FIG. 2A. This embodiment is configured to describe that the corner area may only include a compensation light source.

Figure 2C:
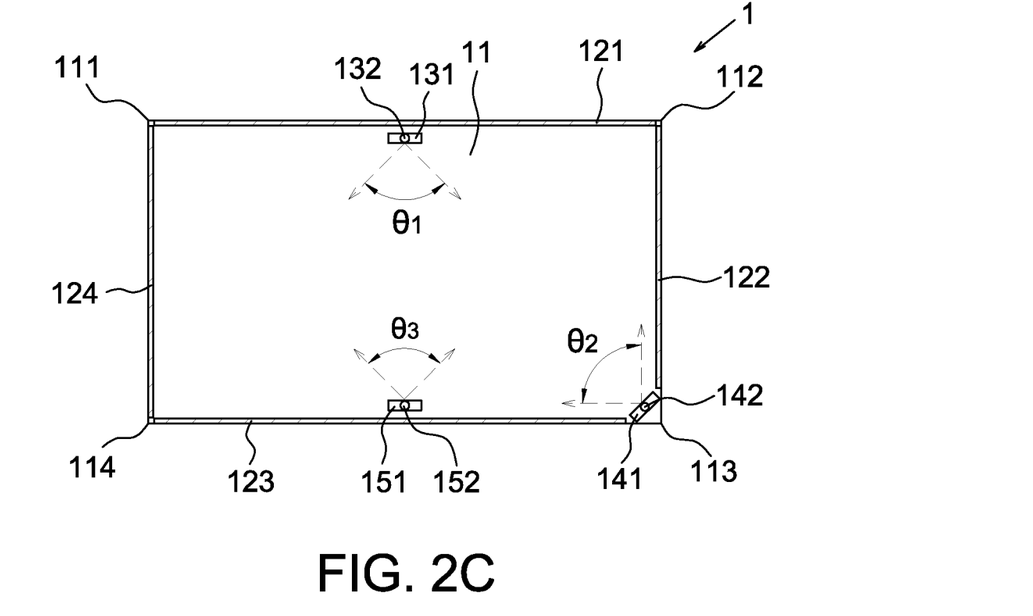

In FIG. 2C, the optical touch system 1 includes the touch surface 11, the light bars 121-124, the first image sensor 131, the first dot light source 132, the second image sensor 141, the second dot light source 142, the third image sensor 151 and the third dot light source 152. The difference from FIG. 2A is that in this embodiment the first image sensor 131 and the first dot light source 132 are disposed at the edge 121 of the touch surface 11 rather than at the corner 111 of the touch surface 11, and other elements are similar to FIG. 2A.

Figure 2D:
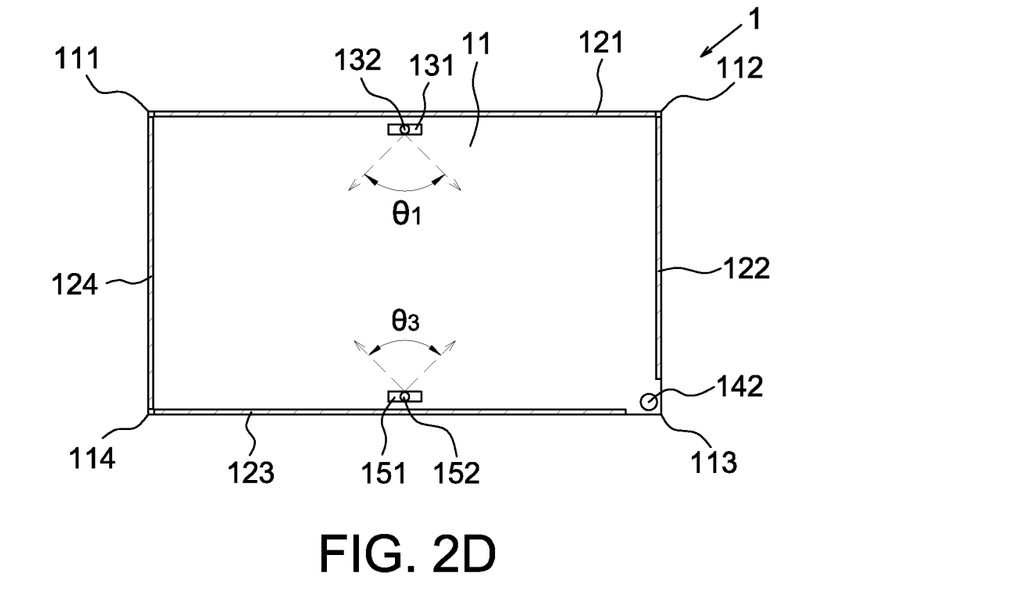

In FIG. 2D, the optical touch system 1 includes the touch surface 11, the light bars 121-124, the first image sensor 131, the first dot light source 132, the second dot light source 142, the third image sensor 151 and the third dot light source 152. The difference from FIG. 2B is that in this embodiment the first image sensor 131 and the first dot light source 132 are disposed at the edge 121 of the touch surface 11 rather than at the corner 111 of the touch surface 11, and other elements are similar to FIG. 2B.

In a word, in FIGS. 2A-2D, the first image sensor 131 and the first dot light source 132 may be disposed at an edge (e.g. the edge 121) of the touch surface 11 or at a corner (e.g. the corner 111) of the touch surface 11 at which the second dot light source 142 (or the second image sensor 141) is not disposed. Each of the corners (e.g. the corner 113) of the touch surface 11 is preferably disposed with a dot light source and it is optional to dispose an image sensor or not at the corners according to system design; that is, although the corners 112 and 114 are not shown a dot light source, the dot light source may be disposed at the corners 112 and 114 if the brightness distribution of the image frames captured by the image sensors 131-151 is not uniform.

The brightness compensation method of the optical touch system 1 according to the embodiment of the present disclosure is described hereinafter.

Figure 3A:
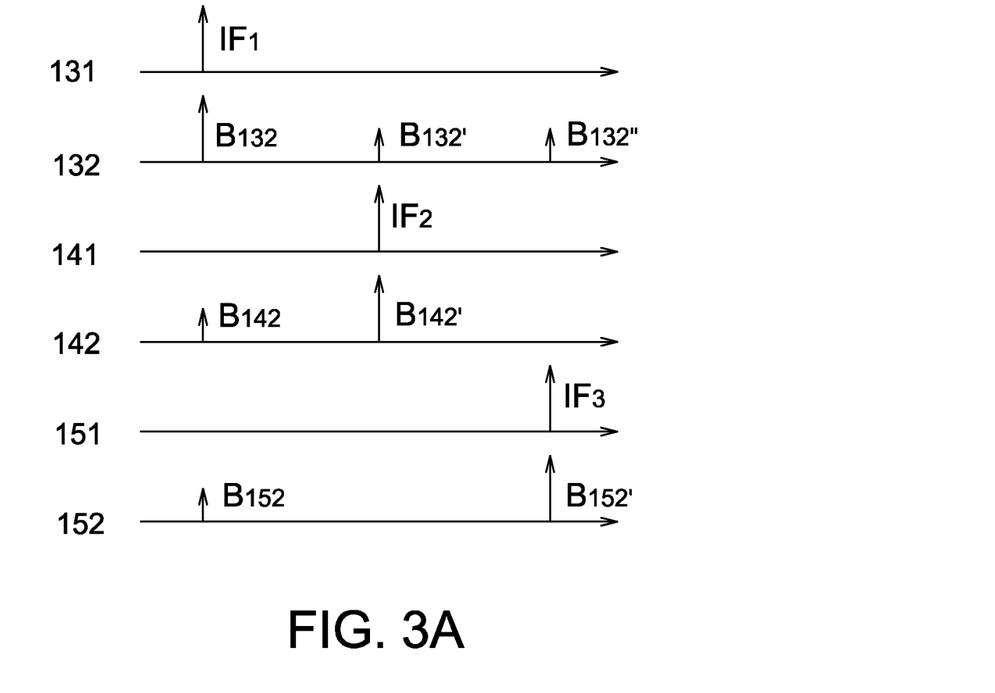
FIGS. 3A-3B show operational schematic diagrams of the optical touch system according to the embodiment of the present disclosure, wherein the light bars are reflection light bars.

Referring to FIGS. 2A, 2C and 3A, FIG. 3A shows an operational schematic diagram of the optical touch system 1 of FIGS. 2A and 2C, wherein the first image sensor 131, the second image sensor 141 and the third image sensor 151 capture image frames sequentially. In other words, the plurality of image sensors included in the optical touch system 1 according to the embodiment of the present disclosure may capture image frames sequentially, wherein it is possible that only one image sensor captures an image frame at a time or a plurality of image sensors respectively capture an image frame simultaneously. In this embodiment, the light bars 121-124 are reflection light bars and the dot light sources 132-152 are configured to illuminate the reflection light bars to allow the reflection light bars to generate reflected light and the dot light sources 132-152 are also served as the compensation light sources.

During an interval that the first image sensor 131 captures a first image frame $IF_1$, in order to compensate the non-uniform brightness at the positions of the second image sensor 141 and the third image sensor 151, the first dot light source 132 emits light with a brightness value $B_{132}$, the second dot light source 142 emits light with a brightness value $B_{142}$ and the third dot light source 152 emits light with a brightness value $B_{152}$. The brightness values of the dot light sources 132-152 are adjusted to have the brightness of the first image frame $IF_1$ be uniform. In one embodiment, the brightness value $B_{132}$ may be larger than the brightness value $B_{142}$ and the brightness value $B_{152}$, wherein the brightness value $B_{142}$ may or may not be equal to the brightness value $B_{152}$.

During an interval that the second image sensor 141 captures a second image frame $IF_2$, in order to compensate the non-uniform brightness at the position of the first image sensor 131, the first dot light source 132 emits light with a brightness value $B_{132}'$ and the second dot light source 142 emits light with a brightness value $B_{142}'$, wherein the brightness value $B_{142}'$ may be larger than the brightness value $B_{132}'$ to have the brightness of the second image frame $IF_2$ be uniform. In addition, in FIGS. 2A and 2C as the third image sensor 151 is not within the field of view $\theta_2$ of the second image sensor 141, the third dot light source 152 does not emit light in this interval.

During an interval that the third image sensor 151 captures a third image frame $IF_3$, in order to compensate the non-uniform brightness at the position of the first image sensor 131, the first dot light source 132 emits light with a brightness value $B_{132}''$ and the third dot light source 152 emits light with a brightness value $B_{152}'$, wherein the brightness value $B_{152}'$ may be larger than the brightness value $B_{132}''$ to have the brightness of the third image frame $IF_3$ be uniform. In this embodiment, the brightness value $B_{132}'$ may or may not be equal to the brightness value $B_{132}''$.

It is appreciated that if the dot light sources 132-152 are light emitting diodes, the brightness value of the dot light sources 132-152 may be indicated by the drive current. If the drive current is larger, the brightness value becomes larger.

Figure 3B:
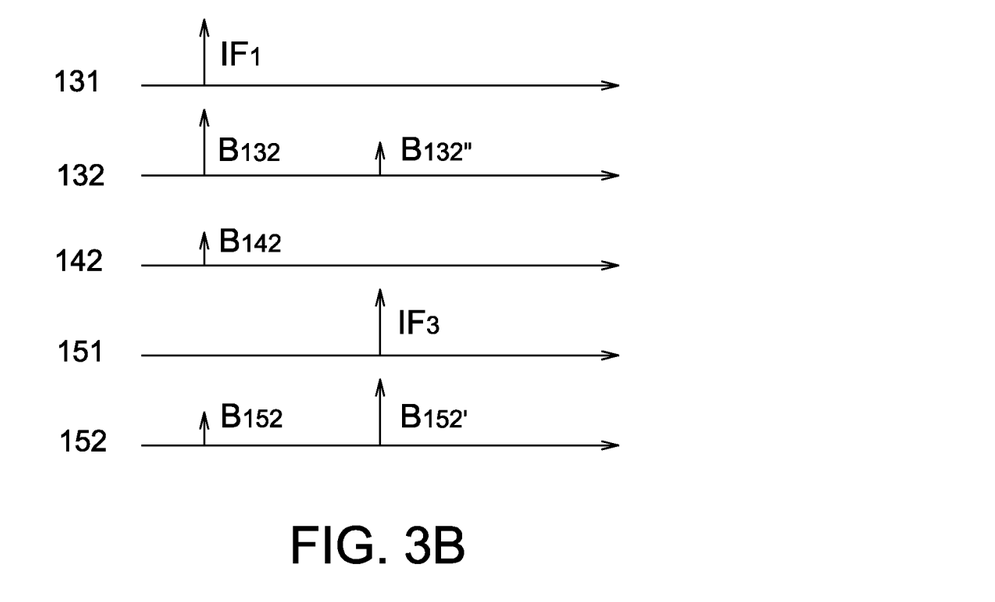

Referring to FIGS. 2B, 2D and 3B, FIG. 3B shows an operational schematic diagram of the optical touch system 1 of FIGS. 2B and 2D, wherein the difference from FIG. 3A is that in this embodiment in the optical touch system 1 the corner 113 of the touch surface 11 is not disposed with the second image sensor 141, and thus only the first image sensor 131 and the third image sensor 151 capture image frames sequentially.

During an interval that the first image sensor 131 captures a first image frame $IF_1$, in order to compensate the non-uniform brightness at the positions of the corner 113 of the touch surface 11 and the third image sensor 151, the first dot light source 132 emits light with a brightness value $B_{132}$, the second dot light source 142 emits light with a brightness value $B_{142}$ and the third dot light source 152 emits light with a brightness value $B_{152}$. The brightness values of the dot light sources 132-152 are adjusted to allow the brightness of the first image frame $IF_1$ to be uniform. In one embodiment, the brightness value $B_{132}$ may be larger than the brightness value $B_{142}$ and the brightness value $B_{152}$, wherein the brightness value $B_{142}$ may or may not be equal to the brightness value $B_{152}$.

During an interval that the third image sensor 151 captures a third image frame $IF_3$, in order to compensate the non-uniform brightness at the position of the first image sensor 131, the first dot light source 132 emits light with a brightness value $B_{132}''$ and the third dot light source 152 emits light with a brightness value $B_{152}'$, wherein the brightness value $B_{152}'$ may be larger than the brightness value $B_{132}''$ to allow the brightness of the third image frame $IF_3$ to be uniform. In this embodiment, the brightness value $B_{132}''$ is preferably smaller than the brightness value $B_{132}$, but actual brightness values may be determined according to the adjusted result.

Figure 4A:
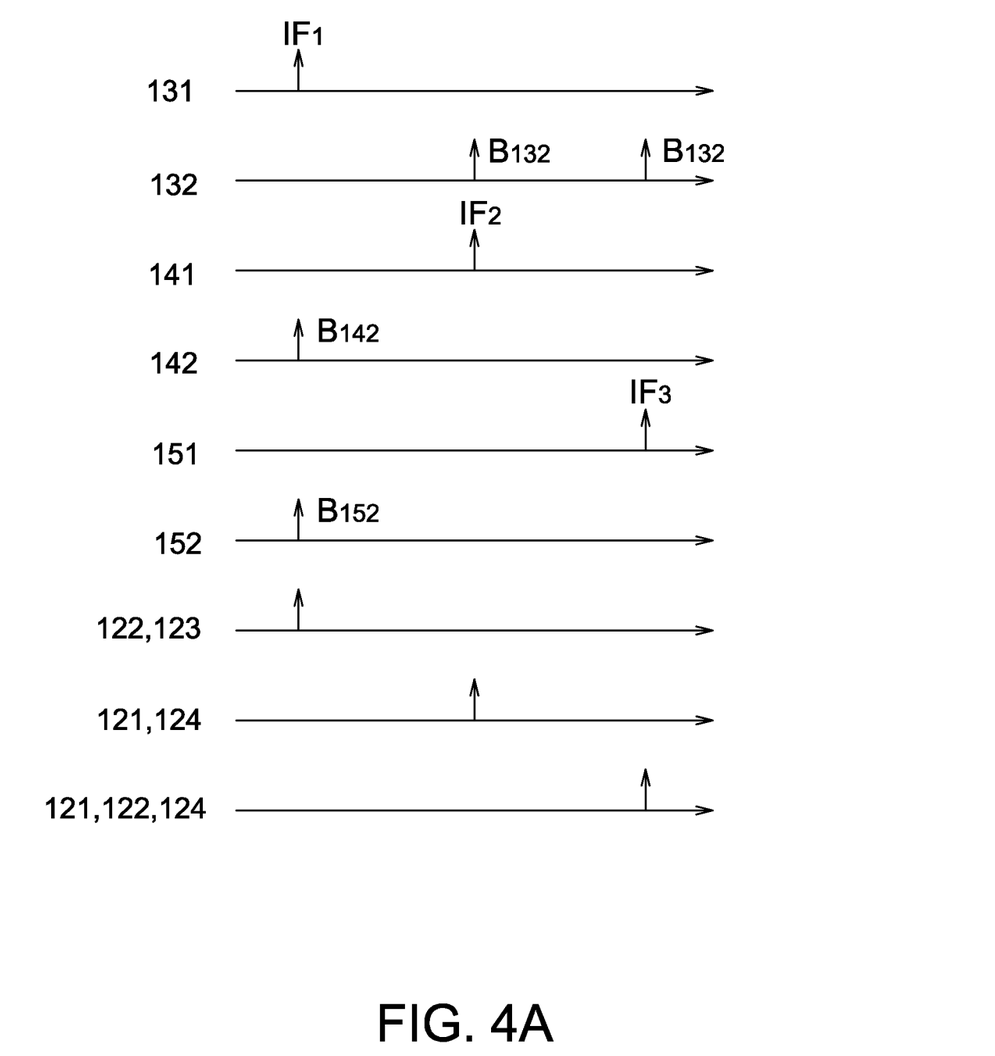
FIGS. 4A-4B show operational schematic diagrams of the optical touch system according to the embodiment of the present disclosure, wherein the light bars are irradiation light bars.

Referring to FIGS. 2A, 2C and 4A, FIG. 4A shows another operational schematic diagram of the optical touch system 1 of FIGS. 2A and 2C. Similarly, the first image sensor 131, the second image sensor 141 and the third image sensor 151 capture image frames sequentially. In this embodiment, the light bars 121-124 are irradiation light bars to emit light actively. Therefore, in this embodiment the dot light sources 132-152 are not configured to illuminate the light bars 121-124 but to perform the brightness compensation only.

During an interval that the first image sensor 131 captures a first image frame $IF_1$, in order to compensate the non-uniform brightness at the positions of the second image sensor 141 and the third image sensor 151, besides at least a part of the light bars (e.g. the light bars 122 and 123 within the field of view $\theta_1$ of the first image sensor 131 herein), the second dot light source 142 and the third dot light source 152 also emit light to allow the brightness of the first image frame $IF_1$ to be uniform, wherein the second dot light source 142 and the third dot light source 152 may emit light with identical or different brightness values.

During an interval that the second image sensor 141 captures a second image frame $IF_2$, in order to compensate the non-uniform brightness at the position of the first image sensor 131, besides at least a part of the light bars (e.g. the light bars 121 and 124 within the field of view $\theta_2$ of the second image sensor 141 herein), the first dot light source 132 also emits light to allow the brightness of the second image frame $IF_2$ to be uniform.

During an interval that the third image sensor 151 captures a third image frame $IF_3$, in order to compensate the non-uniform brightness at the position of the first image sensor 131, besides at least a part of the light bars (e.g. the light bars 121, 122 and 124 within the field of view $\theta_3$ of the third image sensor 151 herein), the first dot light source 132 also emits light to allow the brightness of the third image frame $IF_3$ to be uniform.

Figure 4B:
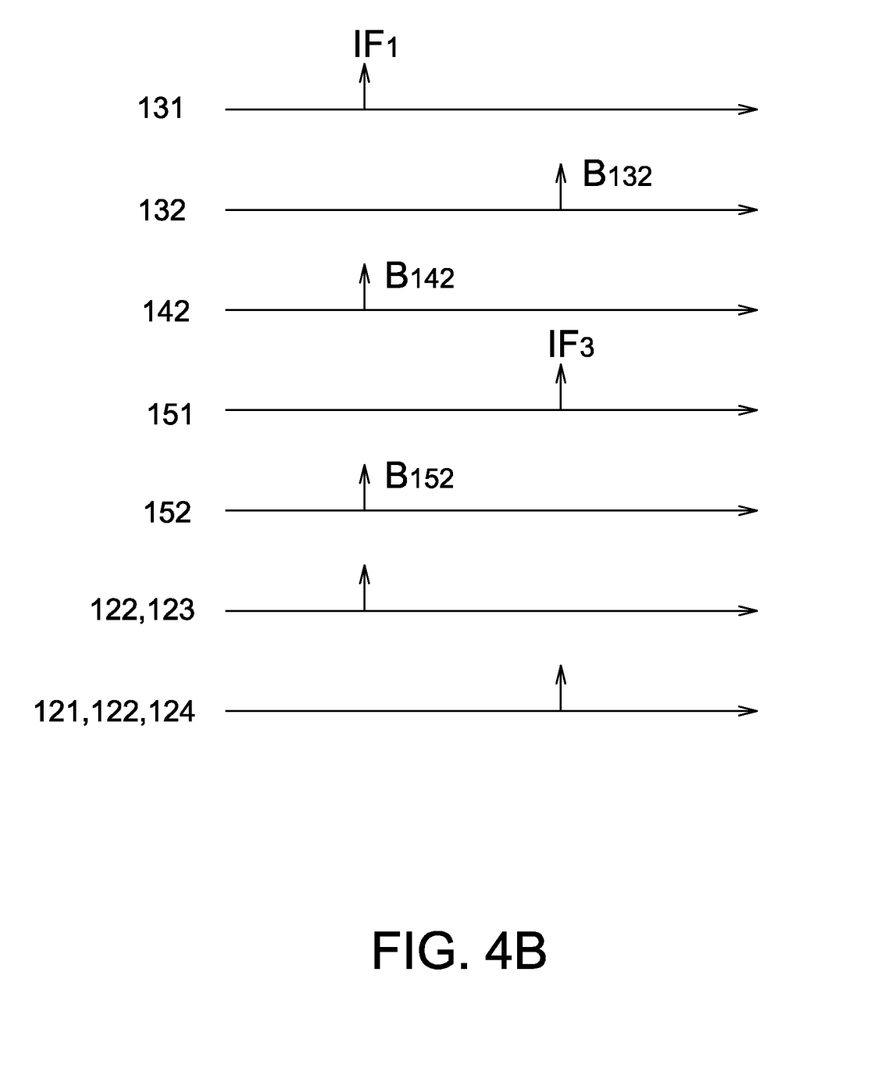

Referring to FIGS. 2B, 2D and 4B, FIG. 4B shows another operational schematic diagram of the optical touch system 1 of FIGS. 2B and 2D, wherein the difference from FIG. 4A is that in this embodiment in the optical touch system 1 the corner 113 of the touch surface 11 is not disposed with the second image sensor 141.

During an interval that the first image sensor 131 captures a first image frame $IF_1$, in order to compensate the non-uniform brightness at the positions of the corner 113 of the touch surface 11 and the third image sensor 151, besides at least a part of the light bars (e.g. the light bars 122 and 123 within the field of view $\theta_1$ of the first image sensor 131 herein), the second dot light source 142 and the third dot light source 152 also emit light to allow the brightness of the first image frame $IF_1$ to be uniform, wherein the second dot light source 142 and the third dot light source 152 may emit light with identical or different brightness values.

During an interval that the third image sensor 151 captures a third image frame $IF_3$, in order to compensate the non-uniform brightness at the position of the first image sensor 131, besides at least a part of the light bars (e.g. the light bars 121, 122 and 124 within the field of view $\theta_3$ of the third image sensor 151 herein), the first dot light source 132 also emits light to allow the brightness of the third image frame $IF_3$ to be uniform.

It is appreciated that the light bars included in the field of view of every image sensor are not limited to those shown in FIGS. 2A-2D.

Figure 5A:
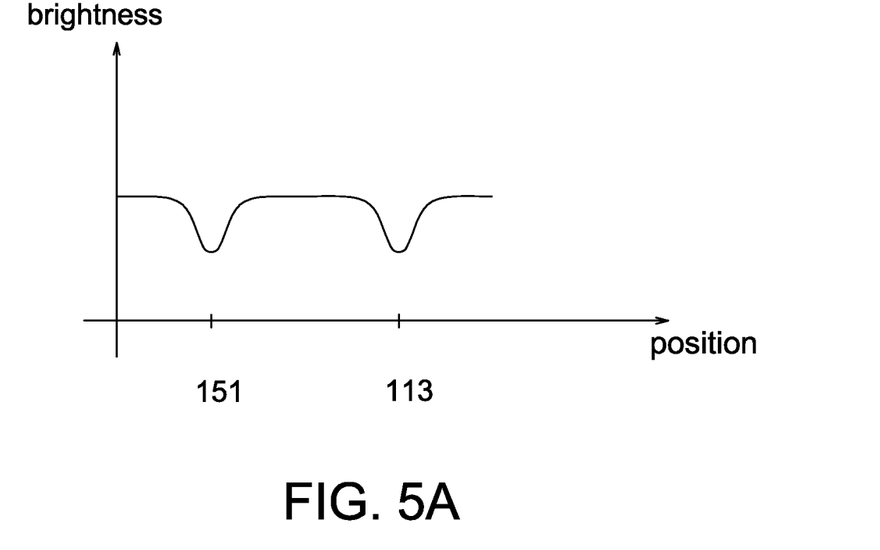
FIGS. 5A-5B show schematic diagrams of the brightness distribution of the image frame captured by the image sensor of the optical touch system according to the embodiment of the present disclosure.
Figure 5B:
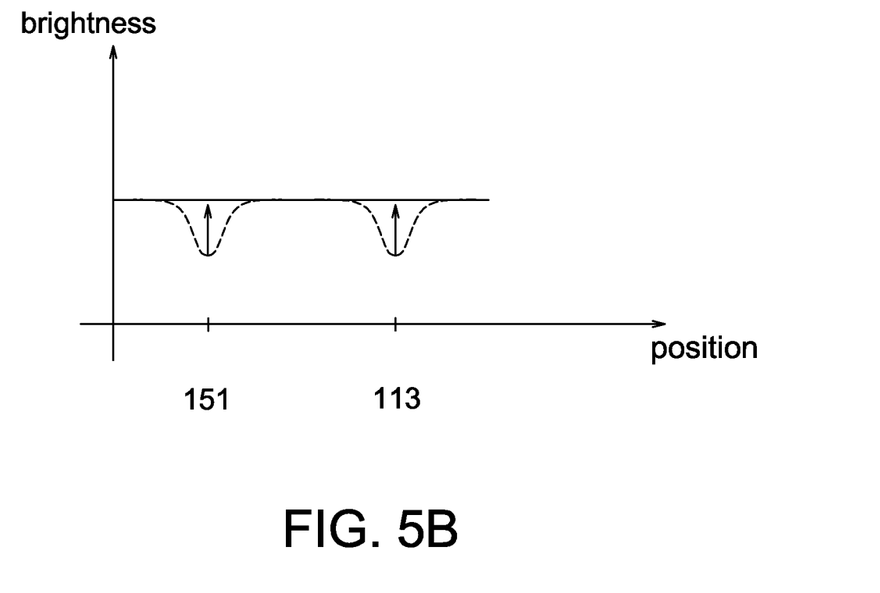

Referring to FIG. 5A, conventionally compensation light sources are not disposed at the corner 113 of the touch surface 11 or adjacent to the third image sensor 151. For example in FIGS. 2A-2D when the first image sensor 131 captures the first image frame $IF_1$, the non-uniform brightness occurs at the positions of the third image sensor 151 and the corner 113 of the touch surface 11. Therefore, the present disclosure provides dot light sources at the positions of the corner 113 of the touch surface 11 and the third image sensor 151 to perform the light compensation so as to compensate the brightness distribution of the first image frame $IF_1$ as shown in FIG. 5B. The brightness of the dot light sources may be set previously.

Therefore, the brightness compensation method of the optical touch system according to the embodiment of the present disclosure has a plurality of working modes. In each working mode at least one image sensor captures an image frame and the dot light source for light compensation is disposed at the positions of the corner and adjacent to other image sensors within the field of view of the image sensor in capturing the image frame so as to perform the brightness compensation, wherein the number of said working modes and the sequence of the image sensors capturing image frames may be determined according to the algorithm for object positioning and tracking without any limitation. The working modes are executed sequentially.

Figure 6:
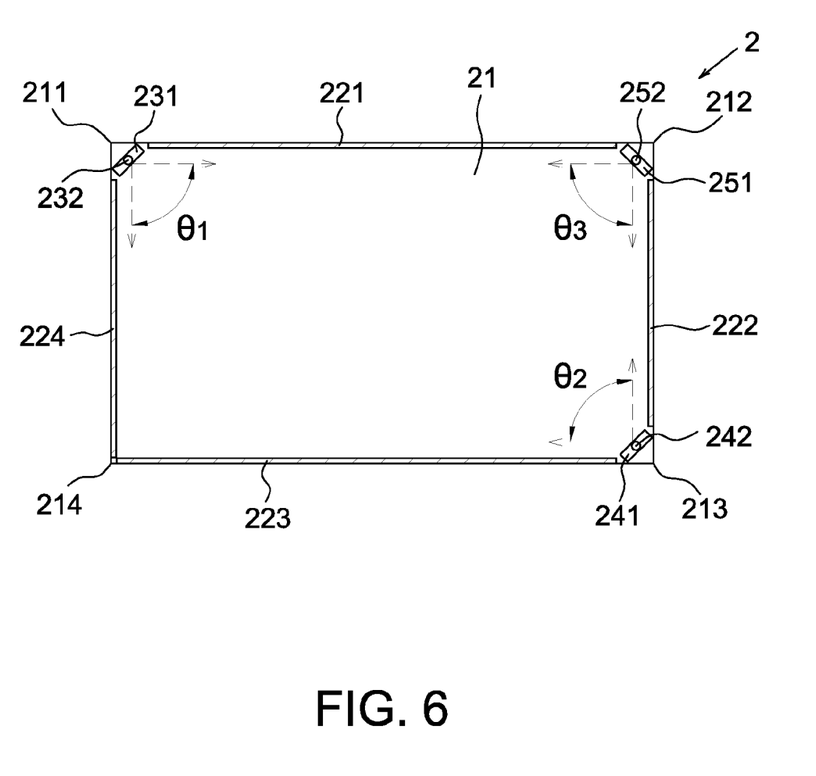
FIG. 6 shows a schematic diagram of the optical touch system according to another embodiment of the present disclosure.

For example referring to FIG. 6, it shows a schematic diagram of the optical touch system 2 according to another embodiment of the present disclosure, which includes a touch surface 21, a plurality of light bars 221-224, a plurality of image sensors (e.g. 231, 241, 251) and a plurality of dot light sources (e.g. 232, 242, 252).

The difference of the optical touch system 2 of this embodiment from the optical touch system 1 of FIGS. 2A-2D is in the disposed positions of the image sensors and the dot light sources. In this embodiment, it is assumed that the second image sensor 241 and the second dot light source 242 are within a field of view $\theta_1$ of the first image sensor 231; the first image sensor 231 and the first dot light source 232 are within a field of view $\theta_2$ of the second image sensor 241; and a field of view $\theta_3$ of the third image sensor 251 does not cover the first image sensor 231 and the second image sensor 241. It is appreciated that the field of views of the image sensors 231, 241 and 251 may be different according to different applications.

The brightness compensation method of the optical touch system according to the embodiment of the present disclosure may include a first working mode, a second working mode and a third working mode executed sequentially. In the first working mode a first image sensor 231 captures a first image frame $IF_1$, and the dot light source not adjacent to the first image sensor 231 but within a field of view $\theta_1$ of the first image sensor 231 (e.g. the second dot light source 242) emits light so as to compensate a brightness distribution of the first image frame $IF_1$ (as shown in FIGS. 5A and 5B); in the second working mode a second image sensor 241 captures a second image frame $IF_2$, and the dot light source not adjacent to the second image sensor 241 but within a field of view $\theta_2$ of the second image sensor 241 (e.g. the first dot light source 232) emits light so as to compensate a brightness distribution of the second image frame $IF_2$; in the third working mode a third image sensor 251 captures a third image frame $IF_3$, and as there is no image sensor within a field of view $\theta_3$ of the third image sensor 251, the light compensation is not necessary. However, if the corner 214 of the touch surface 11 is further disposed with a compensation light source, when the third image sensor 251 is capturing the third image frame $IF_3$ (i.e.

under the third working mode), the compensation light source at the corner 214 of the touch surface 21 emits light so as to compensate a brightness distribution of the third image frame $IF_3$. In addition, the number of the image sensors operating within each working mode is not limited to 1.

Figure 7A:
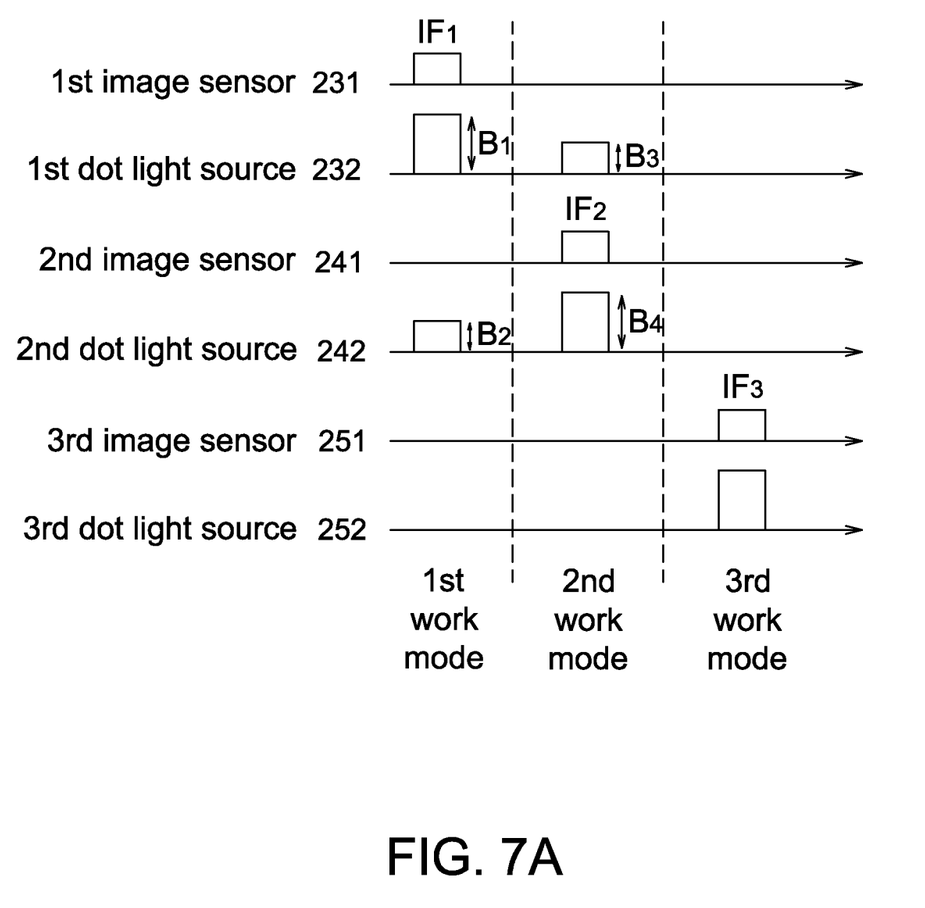
FIGS. 7A-7B show schematic diagrams of the brightness compensation method of the optical touch system of FIG. 6.

Referring to FIG. 7A, it shows a schematic diagram of the brightness compensation method of the optical touch system 2 of FIG. 6, and herein it is assumed that the light bars 221-224 are reflection light bars. In this embodiment, in the first working mode the dot light source 232 adjacent to the first image sensor 231 and the dot light source not adjacent to the first image sensor 231 but within the field of view $\theta_1$ of the first image sensor 231 (e.g. the dot light source 242) emit light with different brightness values, e.g. brightness values $B_1$ and $B_2$ respectively; in the second working mode the dot light source 242 adjacent to the second image sensor 241 and the dot light source not adjacent to the second image sensor 241 but within the field of view $\theta_2$ of the second image sensor 241 (e.g. the dot light source 232) emit light with different brightness values, e.g. brightness values $B_4$ and $B_3$ respectively; and in the third working mode only the dot light source 252 adjacent to the third image sensor 251 emits light.

Figure 7B:
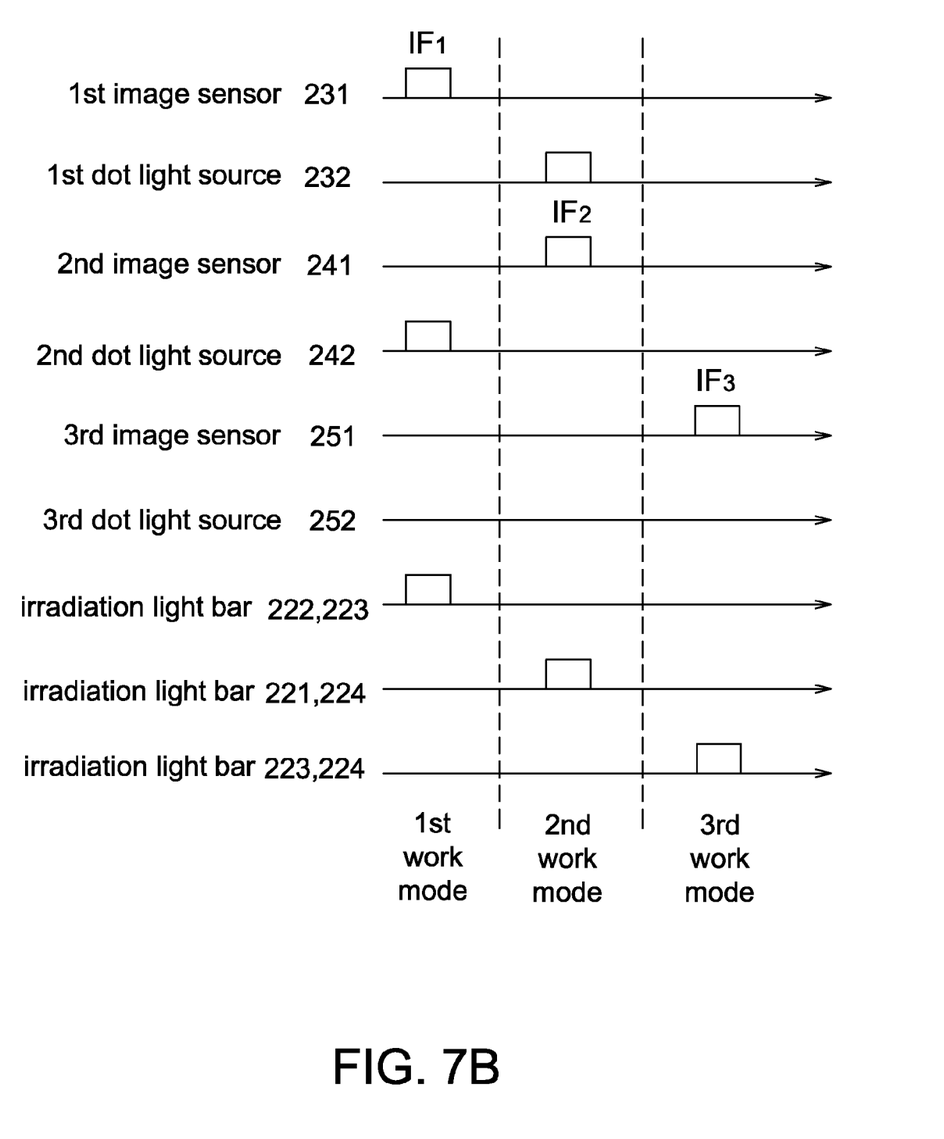

Referring to FIG. 7B, it shows another schematic diagram of the brightness compensation method of the optical touch system 2 of FIG. 6, and herein it is assumed that the light bars 221-224 are irradiation light bars. In this embodiment, in the first working mode the dot light source 232 adjacent to the first image sensor 231 does not emit light whereas the dot light source not adjacent to the first image sensor 231 but within the field of view $\theta_1$ of the first image sensor 231 (e.g. the dot light source 242) emits light, and herein at least a part of the light bars (e.g. 222 and 223 herein) also emit light; in the second working mode the dot light source 242 adjacent to the second image sensor 241 does not emit light whereas the dot light source not adjacent to the second image sensor 241 but within the field of view $\theta_2$ of the second image sensor 241 (e.g. the dot light source 232) emits light, and herein at least a part of the light bars (e.g. 221 and 224 herein) also emit light; in the third working mode the compensation light sources 232, 242 and 252 do not emit light and herein at least a part of the light bars (e.g. 223 and 224 herein) emit light.

Although the image sensors and dot light sources in FIG. 6 are shown to be at the corners of the touch surface 21, the present disclosure is not limited thereto. In another embodiment, the image sensors and their adjacent dot light sources may be disposed at the edges 221-224 of the touch surface 21.

In the embodiment of the present disclosure, the sampling period of the image sensors, the irradiation period of the dot light sources and the irradiation periods of the light bars may be identical or different according to different applications without particular limitation.

In addition, when a light source number of the dot light sources is larger than a sensor number of the image sensors, the dot light source(s) not adjacent to the image sensors is disposed at the corner of the touch surface configured to compensate the non-uniform brightness at the position of the corner.

In addition, the compensation light source in the present disclosure is not limited to the dot light source, and it is possible to select other active light sources such as the linear light source. The compensation light source may be previously designed according to the shape of the dark region in the image frame without particular limitation.

In the above embodiments, the numbers and disposed positions of the image sensors, dot light sources and light bars are only intended to describe, and they can be determined according to different system designs and are not limited to those shown in the present disclosure. The brightness values (or driving current) of the dot light sources and the light bars may be previously adjusted and saved in a memory unit before shipment.

It should be mentioned that in FIGS. 2A-2D and 6, although the image sensors, dot light sources and light bars are shown to be on the surface of the touch surface 11, the present disclosure is not limited thereto. The image sensors, dot light sources and light bars may be fixed upon or on the rim of the touch surface 11 through stand or other members and are not limited to those shown in the drawings herein.

It should be mentioned that although in the above embodiments of the present disclosure the compensation light source is to compensate the image frame to have a uniform brightness, the present disclosure is not limited thereto. According to different applications, the compensation light source may compensate the image frame to a predetermined brightness distribution rather than a uniform brightness distribution.

As mentioned above, as the brightness distribution in the image frame is not uniform at corners of the touch surface and positions of the image sensor in the conventional optical touch system, misidentification may occur. Therefore, the present disclosure further provides an optical touch system (FIGS. 2A-2D and 6) and a brightness compensation method thereof (FIGS. 3A-3B, 4A-4B and 7A-7B) that may compensate the non-uniform brightness distribution in the image frame captured by the image sensor using the system light source or the additional compensation light source to avoid misidentification of the touch position of the object.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical touch system, comprising:
   a touch surface;
   a plurality of reflection light bars respectively disposed at a plurality of edges of the touch surface;
   a first image sensor configured to capture image frames looking across the touch surface;
   a first active light source disposed adjacent to the first image sensor;
   a second active light source disposed at a corner of the touch surface and within a field of view of the first image sensor; and
   a second image sensor
   disposed at the corner of the touch surface where the second active light source is disposed, and
   configured to capture image frames looking across the touch surface;
   wherein
   during an interval that the first image sensor captures a first image frame, the first active light source emits light with a first brightness value and the second active light source emits light with a second brightness value smaller than the first brightness value,
   the first image sensor and the first active light source are within a field of view of the second image sensor, and
   during an interval that the second image sensor captures a second image frame, the first active light source emits light with a third brightness value and the second active light source emits light with a fourth brightness value larger than the third brightness value.

2. The optical touch system as claimed in claim 1, wherein the first image sensor and the first active light source are disposed
- at one of the edges of the touch surface, or
- at a corner of the touch surface where the second active light source is not disposed.

3. The optical touch system as claimed in claim 1, further comprising:
- a third image sensor and a third active light source disposed at one of the edges of the touch surface adjacent to each other and within the field of view of the first image sensor,
- wherein during the interval that the first image sensor captures the first image frame, the first active light source emits light at the first brightness value and the third active light source emits light with a fifth brightness value smaller than the first brightness value.

4. The optical touch system as claimed in claim 3, wherein the first image sensor and the first active light source are disposed
- at one of the edges of the touch surface, or
- at a corner of the touch surface where the second active light source is not disposed.

5. The optical touch system as claimed in claim 3, wherein the second brightness value is equal to or different from the fifth brightness value.

6. An optical touch system, comprising:
- a touch surface;
- a plurality of irradiation light bars respectively disposed at a plurality of edges of the touch surface;
- a first image sensor configured to capture image frames looking across the touch surface;
- a first active light source disposed adjacent to the first image sensor;
- a second active light source disposed at a corner of the touch surface and within a field of view of the first image sensor; and
- a second image sensor
  - disposed at the corner of the touch surface where the second active light source is disposed, and
  - configured to capture image frames looking across the touch surface;
- wherein
- during an interval that the first image sensor captures a first image frame, at least a part of the irradiation light bars and the second active light source emit light, the first image sensor and the first active light source are within a field of view of the second image sensor, and
- during an interval that the second image sensor captures a second image frame, at least a part of the irradiation light bars and the first active light source emit light.

7. The optical touch system as claimed in claim 6, wherein the first image sensor is disposed
- at one of the edges of the touch surface, or
- at a corner of the touch surface where the second active light source is not disposed.

8. The optical touch system as claimed in claim 6, wherein the first image sensor and the first active light source are disposed
- at one of the edges of the touch surface, or
- at a corner of the touch surface where the second active light source is not disposed.

9. The optical touch system as claimed in claim 6, further comprising:
- a third image sensor and a third active light source disposed at one of the edges of the touch surface adjacent to each other and within the field of view of the first image sensor,
- wherein during the interval that the first image sensor captures the first image frame, the third active light source emits light.

10. The optical touch system as claimed in claim 9, wherein the first image sensor is disposed
- at one of the edges of the touch surface, or
- at a corner of the touch surface where the second active light source is not disposed.

11. A brightness compensation method of an optical touch system, the optical touch system comprising a touch surface, a plurality of light bars, a plurality of image sensors and a plurality of active light sources, and each of the image sensors being adjacent to one of the active light sources, the brightness compensation method comprising:
- a first working mode, in which
  - a first image sensor among the plurality of image sensors captures a first image frame, and
  - among the plurality of active light sources, an active light source not adjacent to the first image sensor and within a field of view of the first image sensor emits light to compensate a brightness distribution of the first image frame; and
- a second working mode, in which
  - a second image sensor among the plurality of image sensors captures a second image frame, and
  - among the plurality of active light sources, an active light source not adjacent to the second image sensor and within a field of view of the second image sensor emits light to compensate a brightness distribution of the second image frame;
- wherein
- the first working mode and the second mode are executed sequentially,
- the light bars are irradiation light bars,
- in the first working mode, the active light source adjacent to the first image sensor does not emit light, and
- in the second working mode, the active light source adjacent to the second image sensor does not emit light.

12. The brightness compensation method as claimed in claim 11, wherein the image sensors and the active light sources adjacent thereto are disposed at edges or corners of the touch surface.

13. The brightness compensation method as claimed in claim 11, wherein
- a number of the active light sources is larger than a number of the image sensors; and
- among the plurality of active light sources, an active light source not adjacent to any of the image sensors is disposed at a corner of the touch surface.

* * * * *